Figure 2:
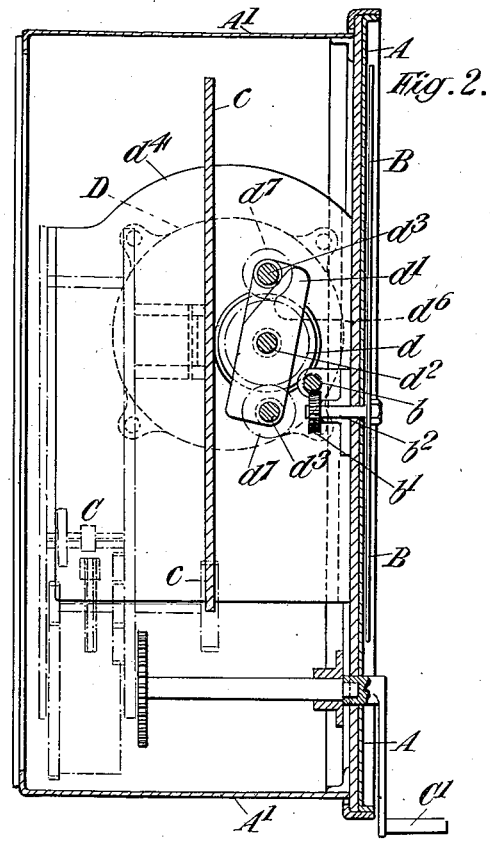

No. 890,411. PATENTED JUNE 9, 1908.
A. T. DAWSON & J. HORNE.
RANGE INDICATOR FOR ORDNANCE.
APPLICATION FILED MAR. 15, 1905.
8 SHEETS—SHEET 1.
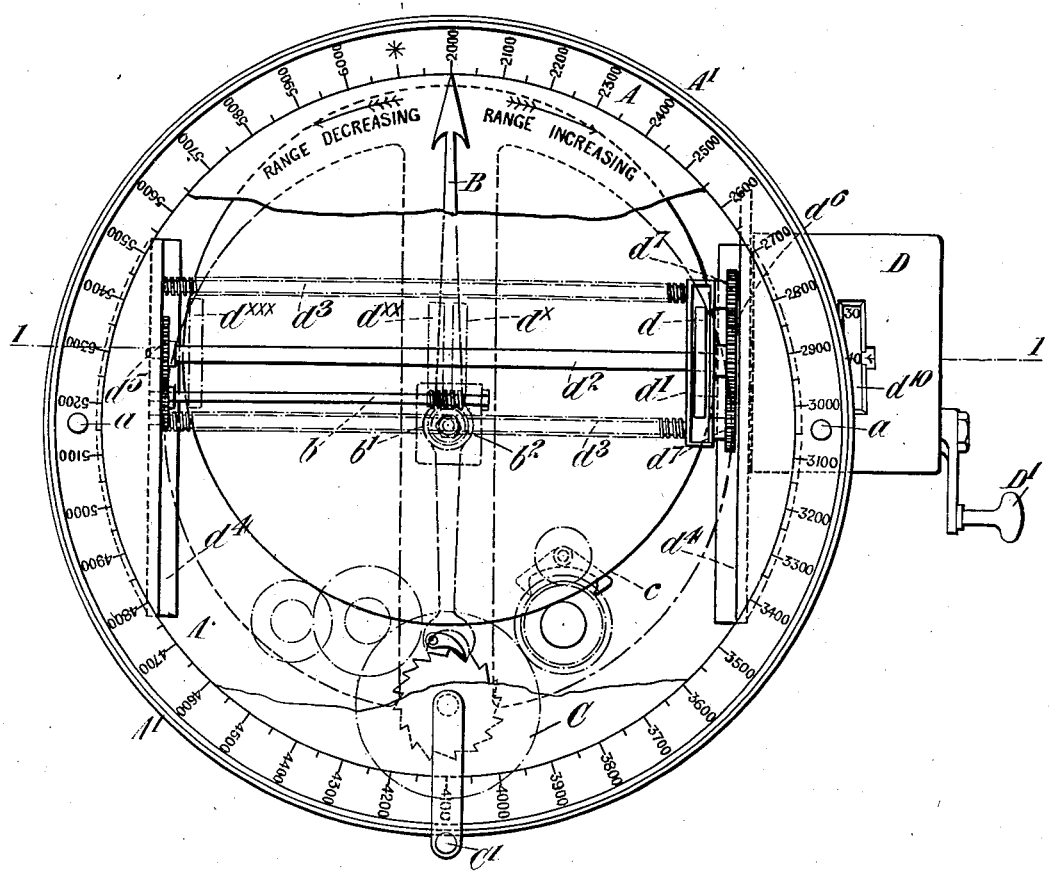
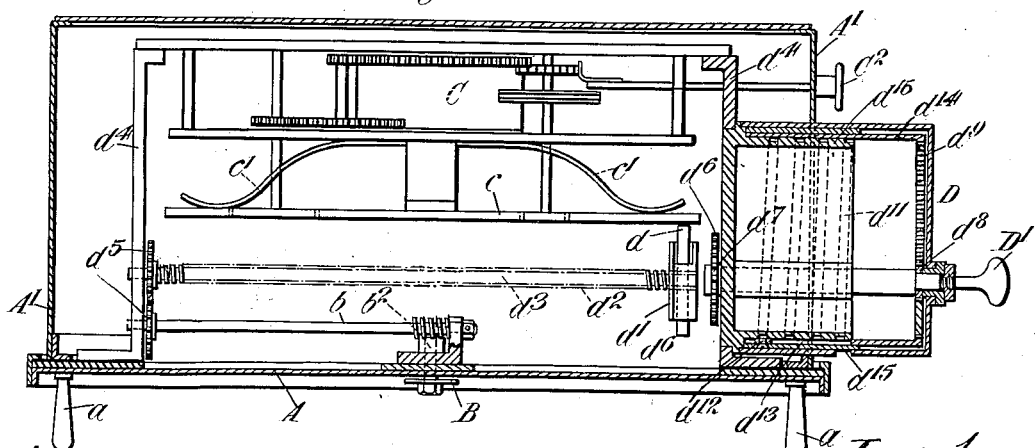
Witnesses.
Inventors.
Arthur T. Dawson.
James Horne.
By James Z. Norris.
Atty.

No. 890,411. PATENTED JUNE 9, 1908.
A. T. DAWSON & J. HORNE.
RANGE INDICATOR FOR ORDNANCE.
APPLICATION FILED MAR. 15, 1905.

8 SHEETS—SHEET 2.

Witnesses.
Dennis Sumby,
Robert Everett.

Inventors.
Arthur T. Dawson.
James Horne.
By James L. Norris.
Atty.

No. 890,411. PATENTED JUNE 9, 1908.
A. T. DAWSON & J. HORNE.
RANGE INDICATOR FOR ORDNANCE.
APPLICATION FILED MAR. 15, 1905.
8 SHEETS—SHEET 3.
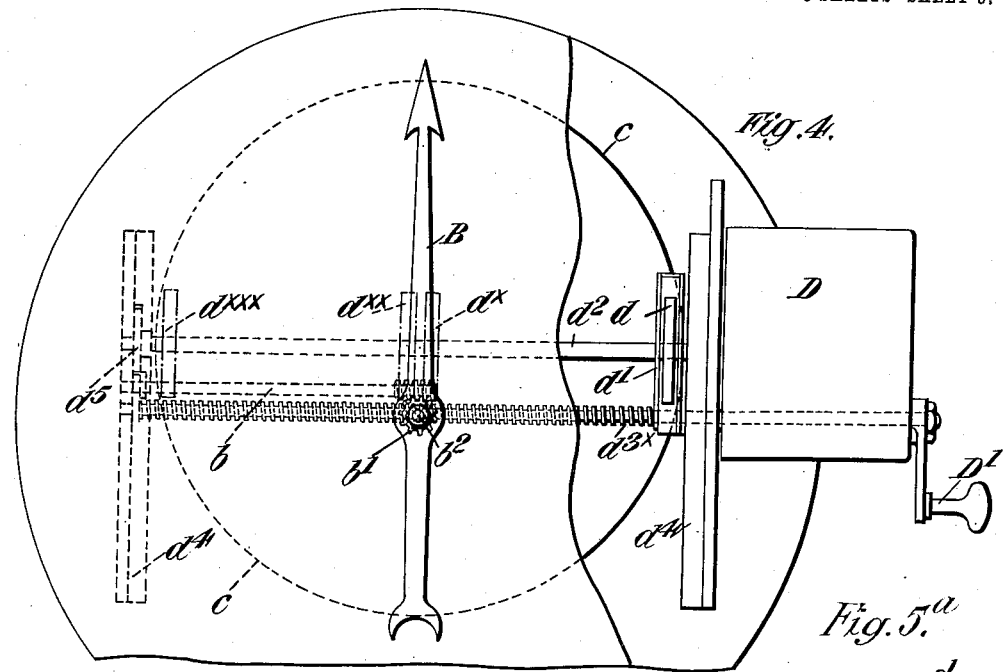
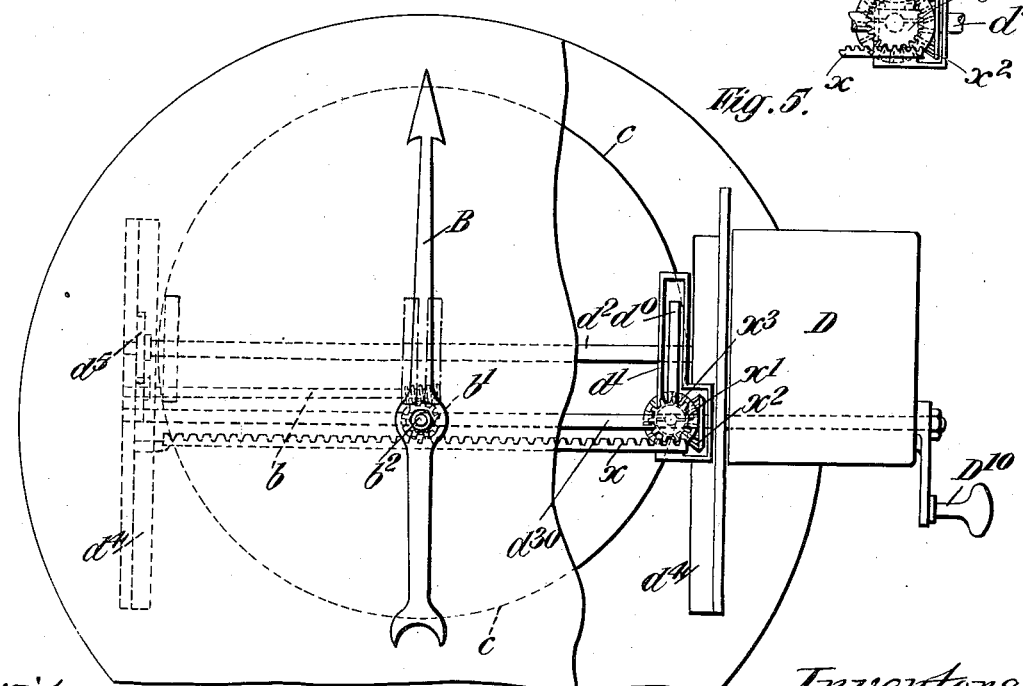
Witnesses,
Inventors.
Arthur T. Dawson,
James Horne.
By James L. Norris, Atty.

No. 890,411. PATENTED JUNE 9, 1908.
A. T. DAWSON & J. HORNE.
RANGE INDICATOR FOR ORDNANCE.
APPLICATION FILED MAR. 15, 1905.
8 SHEETS—SHEET 4.
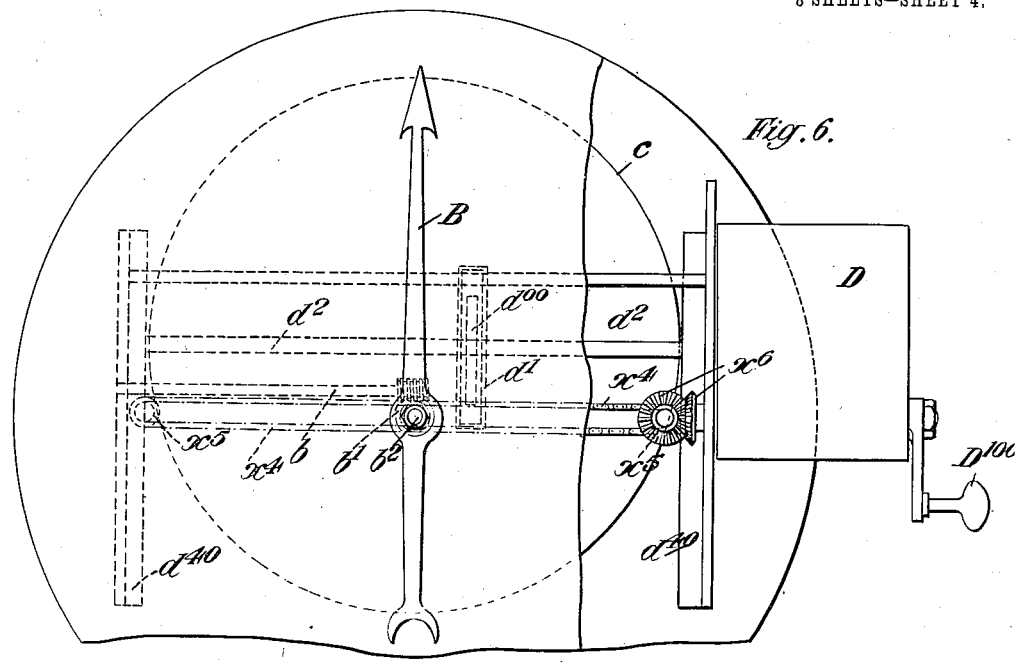
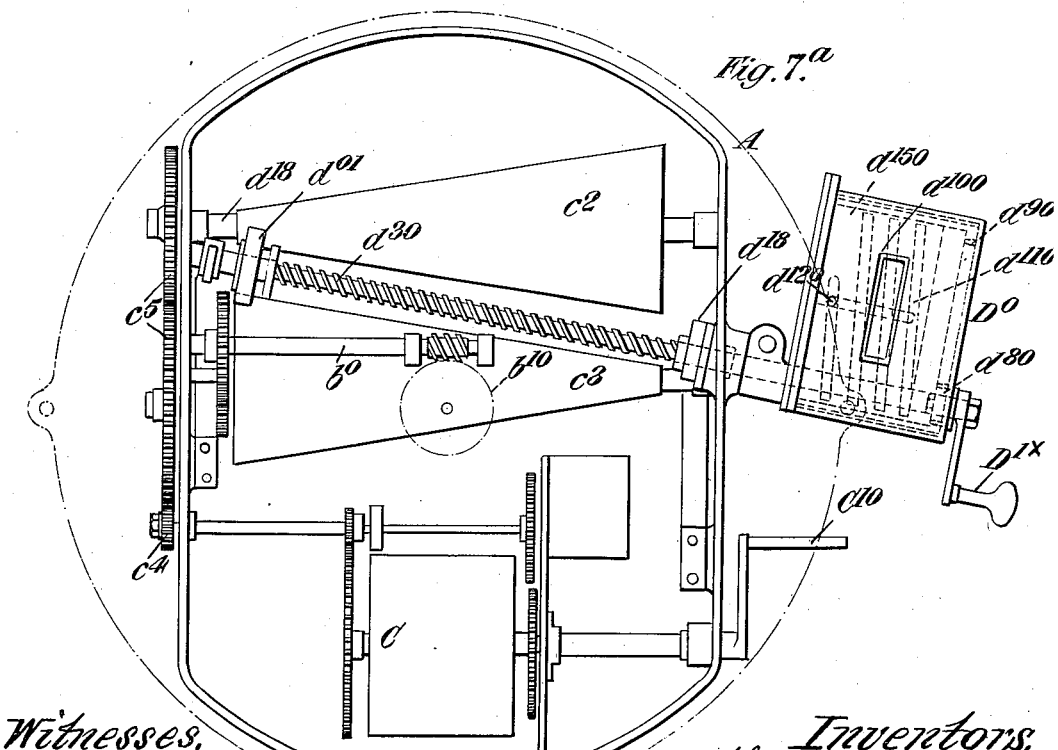

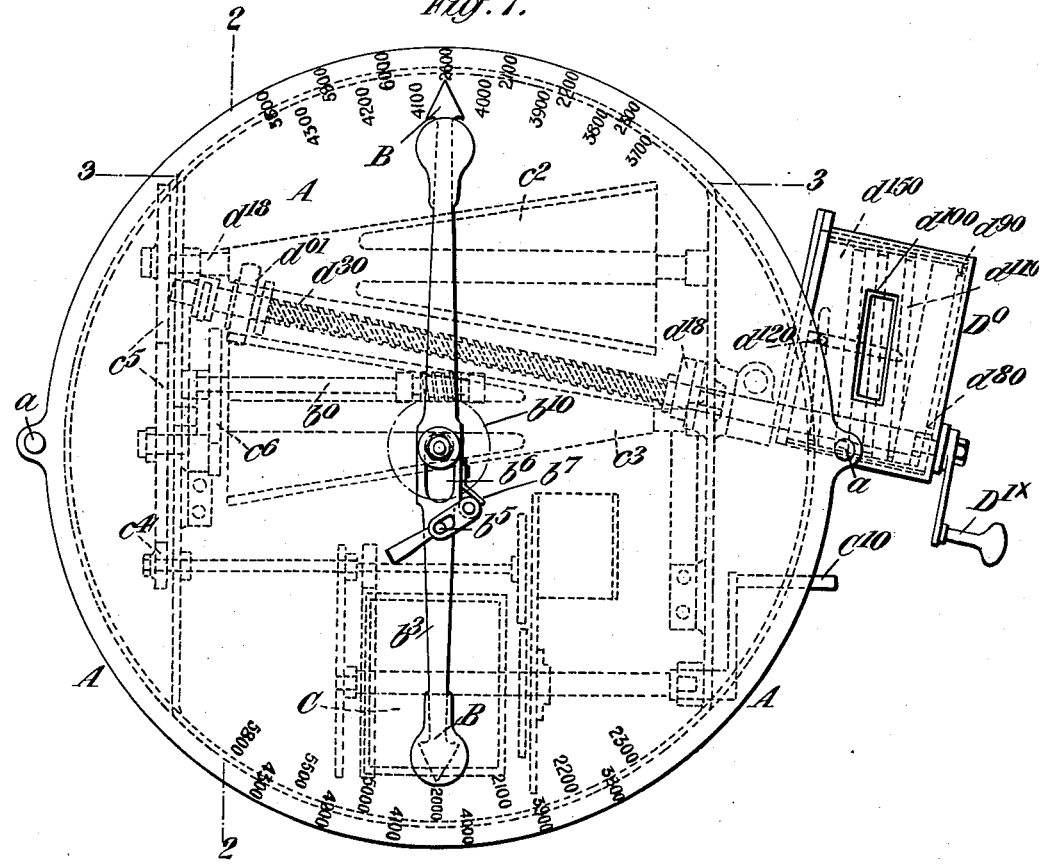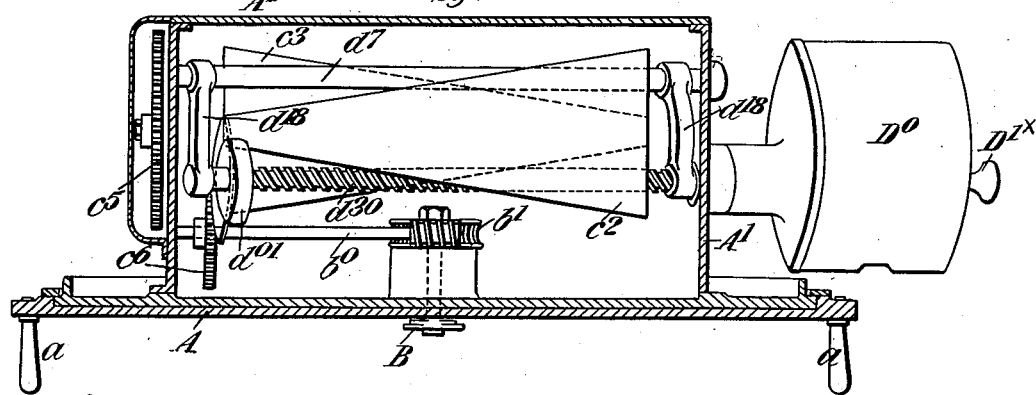

No. 890,411. PATENTED JUNE 9, 1908.
A. T. DAWSON & J. HORNE.
RANGE INDICATOR FOR ORDNANCE.
APPLICATION FILED MAR. 15, 1905.
8 SHEETS—SHEET 6.
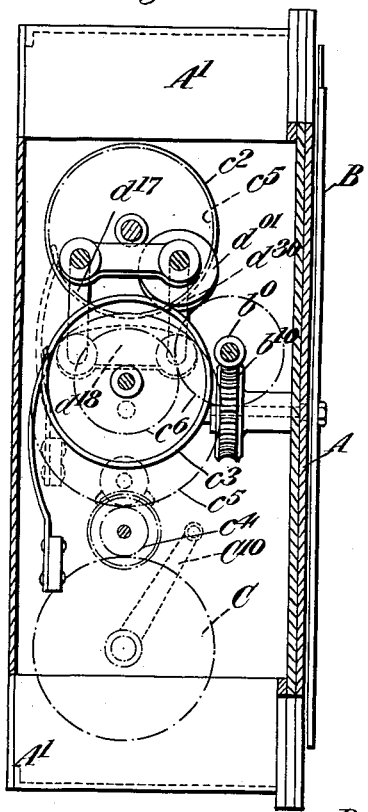
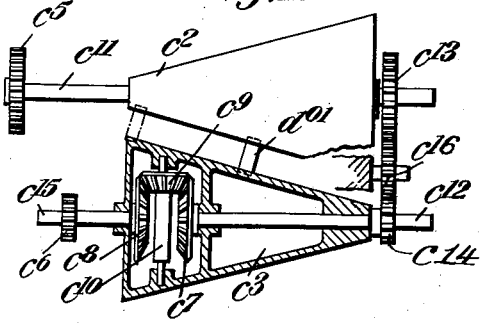
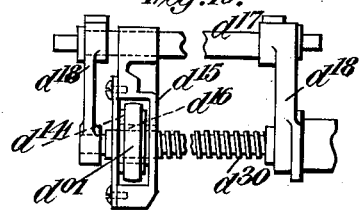
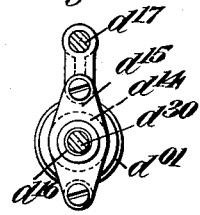
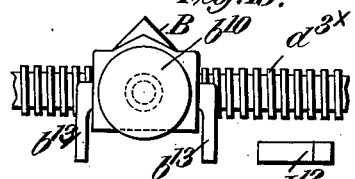
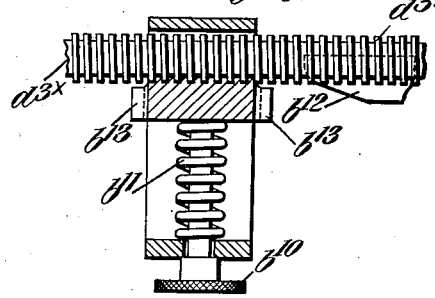
Witnesses.
Dennis Sumby.
Robert Everitt.
Inventors.
Arthur T. Dawson,
James Horne.
By James L. Norris
Att'y No. 890,411. PATENTED JUNE 9, 1908.
A. T. DAWSON & J. HORNE.
RANGE INDICATOR FOR ORDNANCE.
APPLICATION FILED MAR. 15, 1905.
8 SHEETS—SHEET 7.
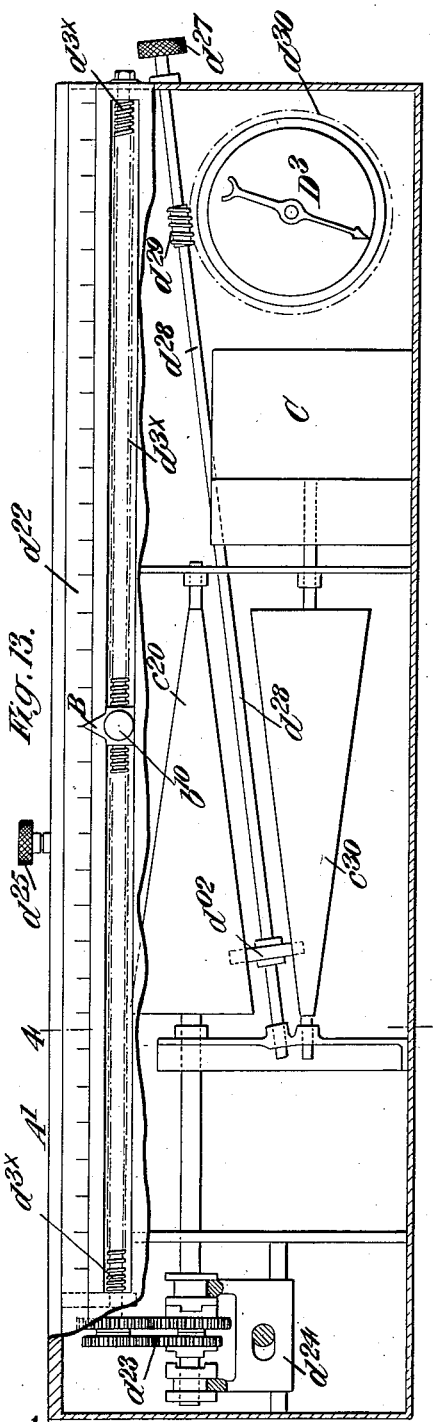
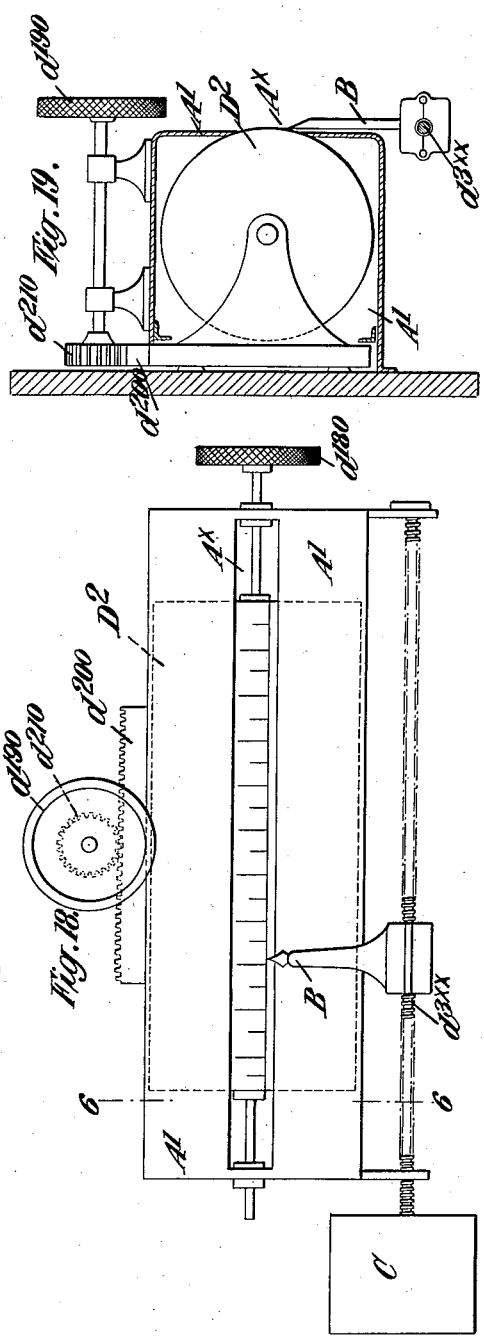
Witnesses.
Inventors,
Arthur T. Dawson,
James Horne.

No. 890,411. PATENTED JUNE 9, 1908.
A. T. DAWSON & J. HORNE.
RANGE INDICATOR FOR ORDNANCE.
APPLICATION FILED MAR. 15, 1905.
8 SHEETS—SHEET 6.
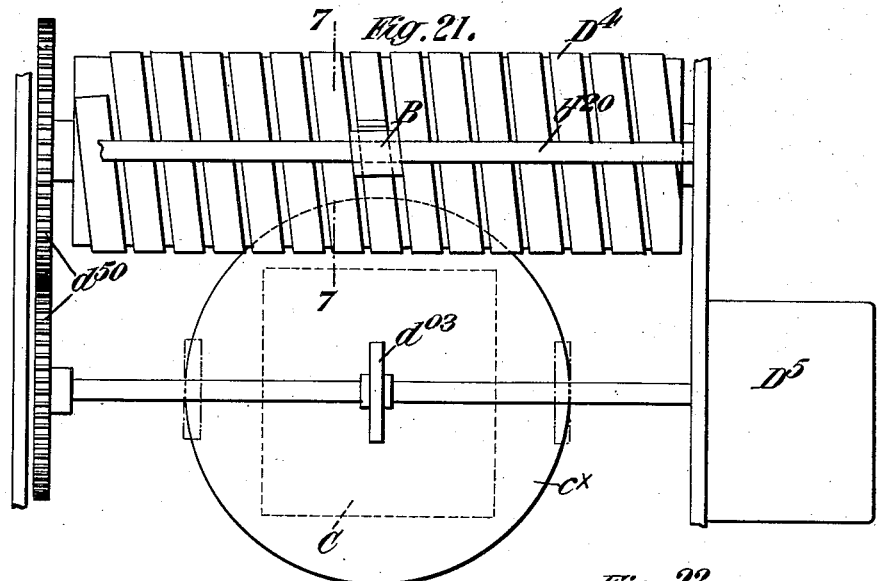
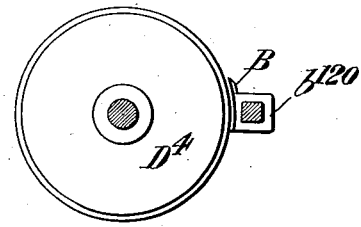
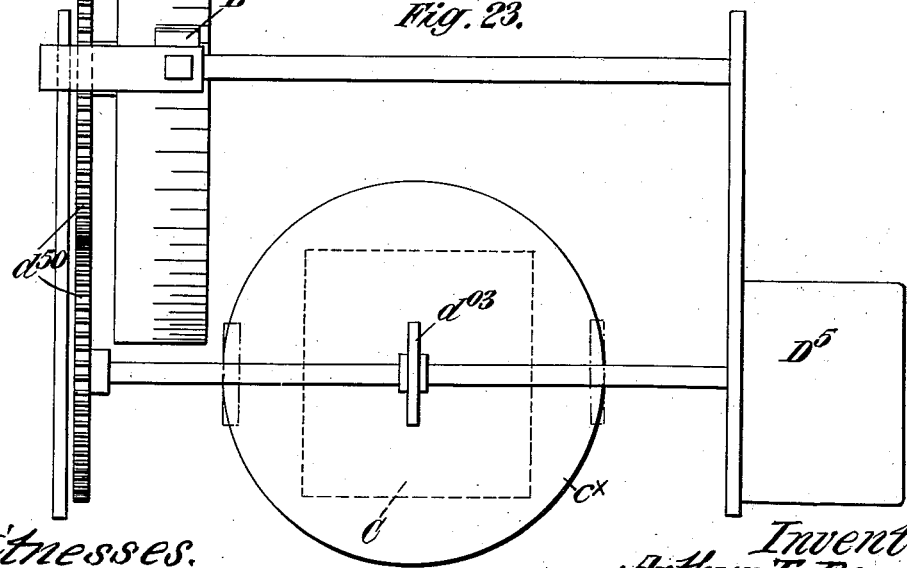
Witnesses.
Inventors,
Arthur T. Dawson,
James Horne,

UNITED STATES PATENT OFFICE.

ARTHUR TREVOR DAWSON, OF WESTMINSTER, AND JAMES HORNE, OF BARROW-IN-FURNESS, ENGLAND, ASSIGNORS TO VICKERS SONS & MAXIM LIMITED, OF WESTMINSTER, ENGLAND.

RANGE-INDICATOR FOR ORDNANCE.

No. 890,411.  Specification of Letters Patent.  Patented June 9, 1908.

Application filed March 15, 1905. Serial No. 250,308.

*To all whom it may concern:*

Be it known that we, ARTHUR TREVOR DAWSON, lieutenant of the Royal Navy, director and superintendent of Ordnance Works, and JAMES HORNE, engineer, both subjects of the King of Great Britain, residing, respectively, at 32 Victoria street, Westminster, in the county of London, England, and care of Vickers Sons & Maxim Limited, Naval Construction Works, Barrow-in-Furness, in the county of Lancaster, England, have invented certain new and useful Improvements in and Relating to Range-Indicators for Ordnance, of which the following is a specification.

This invention relates to apparatus for indicating the variations of range or distance between a gun and its target in cases where either or both are subject to changes of position affecting such range or distance, and has for its chief object instruments for automatically indicating to those in charge of a gun or guns in ships or other naval structures, the necessary information relating to variations in the range or distance due to the relative movements of such ships or structures and the targets.

According to our said invention we construct an instrument or apparatus with a graduated dial drum or bar, and a pointer, either of which is actuated by clockwork or other mechanism capable of imparting thereto an automatic movement which will be constant at any particular speed to which the instrument is set by the operator. By observing the relative speed or change of position between the target and the gun, the operator can ascertain what change of speed or direction of the indicator-index or pointer is necessary to keep the same in correspondence with the alterations in the range or distance of the gun from the target. The instrument is adapted to be adjusted by the operator to bring any particular graduation on the dial or the like opposite the pointer and thereby initially "set" the apparatus; *i. e.* indicate in yards or otherwise the distance corresponding to the range at that instant of time. The speed or rate at which the range or distance between the gun and target varies is then observed and the apparatus adjusted by the operator so as to work in correspondence with such speed, this setting being effected by suitable mechanism controlled by a handle or the like and furnished with appropriate graduations or figures for indicating the speed in knots per hour or otherwise.

If the initial range and the rate of alteration of range have been correctly observed and the instrument correctly adjusted in accordance therewith, the said instrument will continue to automatically indicate (say in yards) the alterations that must be effected in the sighting of the gun to comply with the alteration of the range that takes place by the change of movement between the gun and target. The fall of the projectiles fired from the gun will show whether the instrument has been properly set or whether any further adjustment is necessary, and the operator can from time to time as required, adjust the instrument according to the variations thus observed in the range.

The instrument can be situated in any convenient position in the ship, that is to say in the gun turrets or casemates or in the fighting tops. In the latter case suitable electrical connections would be made with dials or indicators arranged in the casemates or turrets, in order to transmit to the gun sight-setters the corresponding changes in range obtained from the instrument. In the event of the electrical connections failing, the change of range could be transmitted by mechanical means, or by a voice-pipe in charge of an attendant in the fighting top.

In order that our said invention may be clearly understood and readily carried into effect we will describe the same more fully with reference to the accompanying drawings in which:—

Figure 20:
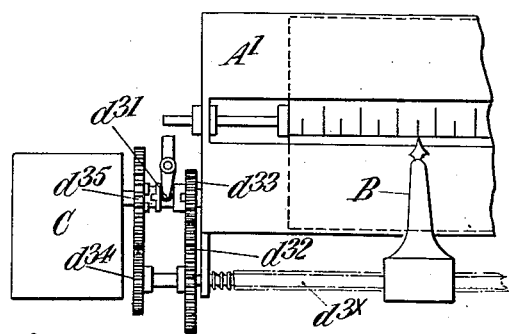
Figure 14:
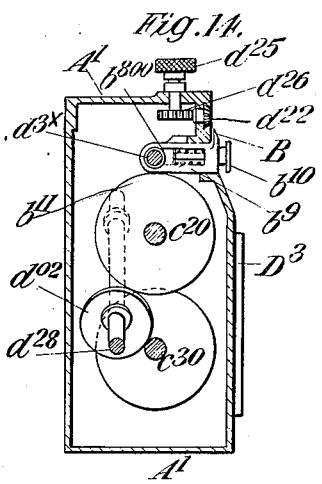

Figure 1 is a front elevation of one form of the instrument. Fig. 2 is a vertical section of the same taken approximately through the center of the instrument. Fig. 3 is a horizontal section taken approximately on the line 1, 1, of Fig. 1. Figs. 4, 5 and 6 are front elevations similar to Fig. 1, but show modified forms of some of the internal mechanism. Fig. 5ª is a detail view of a part of the gearing shown in Fig. 5. Fig. 7 is a front elevation. Fig. 7ª is a rear elevation. Fig. 8 a vertical section taken approximately on the line 2, 2, of Fig. 7, and Fig. 9 a horizontal section taken approximately on the line 3, 3 of Fig. 7 showing a modified form of the instrument. Figs 10 and 11 are respectively a detail elevation and an end view of a portion of the internal mechanism. Fig. 12 is a sectional elevation showing another part of the internal mechanism. Figs. 13 and 14 are respectively a sectional front elevation and a vertical section taken approximately on the line 4, 4 of Fig. 13 showing more or less diagrammatically a further modified form of the instrument. Fig. 15 is a front elevation, Fig. 16 a plan, and Fig. 17 a cross section on the line 5, 5 of Fig. 15, showing a modification of the arrangement illustrated in Figs. 13 and 14. Figs. 18 and 19 are respectively a front elevation, and a vertical section taken approximately on the line 6, 6 of Fig. 18 showing more or less diagrammatically another modified form of the instrument. Fig. 20 is a front elevation of a modification of the arrangement shown in Figs. 18 and 19. Figs. 21 and 22 are respectively a front elevation and a vertical section on the line 7 7 of Fig. 21 showing diagrammatically another modified form of the instrument. Fig. 23 is a front elevation of a further modification of the instrument.

In all these figures like letters of reference indicate similar parts.

Referring first more particularly to Figs. 1 to 3; A is the graduated dial, B the pointer, C the clock movement, and D the casing inclosing the mechanism for setting the speed at which the instrument works relatively to the speed at which the range is changing. The speed and direction of movement of the pointer B is varied by the position of a friction roller $d$ relatively to a revolving disc $c$ driven by the clock movement at a constant speed. That is to say according as the friction roller is moved nearer to or further from the center of the disk, said friction roller will be driven at a greater or less velocity by said disk, the necessary frictional contact between the roller and disk being obtained by the action of a spring $c'$. The friction roller is mounted in a cross-head or frame $d'$ and adapted to slide on and turn with a spindle $d^2$ to which it is connected by a groove and feather $d^{\times\times}$. Passing through the said frame are two screw spindles $d^3$ arranged parallel to the spindle $d^2$ and rotatably supported at their ends in frames or side plates $d^4$. The spindle $d^2$ is geared at one end by toothed wheels $d^5$ with a worm spindle $b$ which drives a worm $b'$ on the axle $b^2$ of the pointer B. $d^6$ is a toothed wheel which gears with toothed wheels $d^7$ of equal diameters on the screw spindles $d^3$, so that these toothed wheels and their screw spindles will revolve simultaneously in the same direction and at the same velocity when actuated. The spindle which carried the toothed wheel $d^6$ is prolonged through the casing D and is provided with a handle D' for operating it. The friction roller $d$ can thus be caused to traverse the face of the said disk toward or away from the center or axis thereof and on either side thereof for varying the speed of movement of the pointer B in either direction to accord with the rate of increase or diminution in the range. The aforesaid spindle that is prolonged through the casing D has thereon a toothed pinion $d^8$ gearing with teeth $d^9$ (Fig. 3) formed on the internal drum or sleeve $d^{14}$. A second internal drum $d^{15}$ is provided with graduations which are visible through an oblique opening $d^{10}$ in the casing D. These graduations correspond with the speed at which the range or distance between the gun and target increases or diminishes and are preferably arranged to indicate the speed in knots as aforesaid. The said indications are arranged spirally on the drum which latter in addition to rotating also receives a traversing movement thus enabling large and plain readings to be used thereon. The traversing movement is effected by a spiral groove or slot $d^{11}$ on an inner stationary cylindrical piece $d_i^{16}$ engaging with a pin $d^{12}$ on the inside of the graduated drum $d^{10}$. The drum or sleeve $d^{10}$ is slotted at $d^{15}$ where the pin passes through it to engage with the spiral groove of the aforesaid cylindrical piece. This arrangement permits of the traversing movement of the graduated drum $d^{15}$ to take place when the sleeve $d^{10}$ is rotated. The said dial A is capable of angular displacement in the casing A' of the instrument independently of the other parts and for this purpose it may have handles $a$ $a$ for enabling it to be readily turned about the axis of the pointer. If it be found that the range between two ships in action is 2000 yds. and that this range is increasing by the relative movement between the two ships at a rate of 40 knots per hour, (i. e. the highest speed indicated by the instrument in this case) the graduated dial would be first angularly shifted about the axis of the pointer B in order to bring the 2000 indication thereon opposite the pointer as shown in Fig. 1. The handle D' would then be turned to bring the "40" indication visible in the opening $d^{10}$ of the casing D, such operation also causing the friction roller to travel along its spindle until it reaches its most remote point relatively to the axis of the disk $c$ as shown at $d$ in Figs. 1 and 3. The clock movement having been released the disk $c$ would revolve the friction roller and through it the pointer at a corresponding speed, so that the increase in range due to the relative movement of the ships would be continually indicated by the pointer as it passed over the various graduations of the dial A and thus said pointer will indicate the variations in range that the gunner must make in his sighting of the gun for keeping said gun at the proper range for hitting the target, (i. e. the other ship). If however the speed at which the range or distance between the two ships varied, diminished say to 20 knots per hour, then the handle D' would be turned in the reverse direction until the figure 20 appeared in the opening of the casing D, and this movement would cause the friction roller to assume a position about halfway between the axis and periphery of the disk $c$ with the result that the friction roller and therefore the pointer B will travel at half the velocity they traveled when the instrument was set to the 40 knots indication.

If it should be found that the pursuing ship was gaining on the other and in that way reducing the range or distance between them, then the handle D' would be turned until the friction roller passed the axis of the disk $c$ and assumed say the position or any intermediate position in accordance with the speed at which the range diminished. The friction roller and therefore the pointer B would then revolve in the opposite direction and indicate on the dial A diminished ranges, while the indications exhibited in the opening of the casing D would accord with the speed. The clock movement C is provided with a winding key or handle C' (Fig. 1) for enabling the spring to be rewound at intervals in order to keep the clock movement working. $C^2$ is a stop for arresting and releasing the clock movement as required. In the example shown in Fig. 3, this stop comprises a spring or resilient finger carried by a spindle which can be rocked in one or other direction to cause said spring or finger to engage with or release the balance wheel of the clock movement.

Instead of the two screw spindles $d^3$ a single screw spindle might be employed as in Fig. 4; or the friction roller might be caused to traverse the disk $c$ by means of a rack and pinion as in Fig. 5, or by means of a pitch chain as in Fig. 6, or by other convenient means; we prefer however to use the two screws $d^3$.

In Fig. 5 $x$ is the rack which is stationary and $x'$ is a pinion gearing therewith. This pinion and the bevel wheel gear $x^2$ $x^3$ are journaled in the frame of the friction roller $d^0$. Rotary motion is transmitted to the gear by the spindle $d^{30}$ which is actuated by the handle $D^{10}$, the said spindle passing through the bevel wheel $x^2$ which has a feather engaging with a groove on the spindle. In Fig. 6 $x^4$ is a chain passing around sprocket wheels $x^5$ $x^5$ carried by the side plates $d^{40}$. The two ends of the chain are attached to the frame of the friction roller $d^{00}$ and rotary movement is transmitted to the sprocket wheel that lies near the handle $D^{100}$ by means of bevel gear $x^6$.

In the modified form of our instrument shown by Figs. 7 to 11, we use in place of the disk $c$ for actuating the friction roller $d$ as above described with reference to Figs. 1 to 6, conical rollers $c^2$ $c^3$, the reverse action of the pointer being obtained by means of the differential gear shown in Fig. 12. One conical roller for driving the friction roller might in some cases be used, but for a large variation of speed we prefer to use two conical rollers with the friction roller between them as illustrated in this modification. One of the conical rollers (viz. $c^2$) is driven at constant speed from the clock movement C through the toothed pinion $c^4$ and toothed wheels $c^5$, the movement being transmitted from this conical roller through the friction roller $d^0$ to the other conical roller $c^3$. The latter is connected by a train of toothed wheels $c^6$ to the worm spindle $b$ and thence through the worm wheel $b^{10}$ to the pointer B. The friction roller $d^0$ rotates on a sleeve $d^{14}$ (Figs. 10 and 11) formed on a frame or cross head $d^{15}$ through which the traversing screw $d^{30}$ passes and engages with a screw nut $d^{16}$ of the said cross head so as to traverse the latter without revolving the roller $d^0$. This cross head is guided in its movements by a stationary rod $d^{17}$ which is situated parallel to the screw spindle $d^{30}$ and is carried by brackets $d^{18}$. This rod $d^{17}$ will prevent movement of the cross head across the axis of the screw spindle $d^{30}$ by the rotation of the roller $d^0$ or of the screw spindle $d^{30}$ itself. The aforesaid differential gear comprises a train of bevel wheels $c^7$ $c^8$ $c^9$ (Fig. 12) arranged inside the conical roller $c^3$. The transverse axle $c^{10}$ carrying the intermediate bevel wheel $c^9$ is rotatably mounted within the said conical roller $c^3$ and rotates therewith when the latter revolves. The spindle $c^{11}$ and the conical roller $c^2$ it carries are rotated at a constant speed by the clock movement which also rotates the spindle $c^{12}$ and the bevel wheel $c^7$ by means of toothed wheels $c^{13}$, $c^{16}$ and $c^{14}$ of which $c^{16}$ is an idler wheel. The spindle $c^{15}$ is geared with the dial pointer B and receives its rotary movement from the bevel wheel $c^8$. The conical roller $c^3$ is mounted loosely on the spindles $c^{12}$ $c^{15}$. The spindle $c^{12}$ is rotated at a greater speed than the conical roller $c^2$ and in the present case it is arranged to be rotated at twice the speed of the roller, the ratio of the gearing $c^{13}$, $c^{16}$, $c^{14}$ being as 2 to 1. If the conical roller $c^3$ be restrained from rotating the spindle $c^{15}$ would revolve at the same speed as the spindle $c^{12}$. With the friction roller $d$ in the middle position as represented by the full lines the conical rollers $c^2$ $c^3$ rotate at the same speed and the spindle $c^{10}$ and bevel wheel $c^9$ are in consequence rotated about the axis of the conical roller $c^3$ at half the speed of the spindle $c^{12}$, the result being that no movement is transmitted to bevel wheel $c^8$. By moving the friction roller $d^0$ to either of the positions indicated by dotted lines on the right and left of the figure, the conical roller $c^3$ is caused to rotate at a greater or less speed respectively, thereby causing the bevel wheel $c^8$ together with its spindle $c^{15}$ to move in opposite directions and with varying velocities depending on the position of the friction roller $d^{0\prime}$ with respect to its middle position. The said screw spindle $d^{30}$ is prolonged through the casing $D^0$ and furnished with a handle $D^{1\times}$ for actuating it the rotary and traversing speed indicating drum $d^{10}$ being operated from said spindle through a pinion $d^{80}$, teeth $d^{90}$, spiral groove $d^{110}$, and stationary pin $d^{120}$ as in the preceding arrangement already described. The indications of the said drum $d^{150}$ are exposed through the opening $d^{100}$. The graduated dial A is furnished with handles $a$ $a$ for enabling its graduations to be initially set as above explained with reference to Figs. 1 to 3.

Instead of reversing the movement of the pointer B for decreasing range, we may provide on the dial face two sets of graduations which progress in opposite directions, as shown in Fig. 7; one set being used for increasing range and one set for decreasing range. The pointer B would then be double ended one end traveling over one set of graduations and the opposite end over the other set of graduations. The said pointer would also be provided with a longitudinally movable sheath $b^3$ so arranged that when one end of the pointer is exposed the other is hidden, according as one or other of the sets of graduations is to be observed. The movement of said sheath is effected by a lever $b^4$ hinged to the pointer and having a slot for the reception of a pin $b^5$ on the sheath, so that by shifting said lever in one or other direction, the sheath will be correspondingly moved. To permit of the sheath thus shifting it has a slot $b^6$ where it fits around the axle of the pointer. The said lever has the end adjacent to the hinge formed with flat surfaces against one or other of which a spring $b^7$ presses and keeps said handle in either of its extreme positions of movement.

The clock movement is furnished with the winding key $C^{10}$ as in the previous arrangement and with a stop similar to the stop $C^2$ for arresting and releasing the said movement.

In the modified form of our instrument illustrated by Figs. 13 and 14, the pointer B is rectilinearly reciprocated over a graduated rack bar or scale plate $d^{22}$ by a screw spindle $d^{3\times}$ whose direction of movement can be reversed by means of suitable change gearing $d^{23}$, controlled by a sliding clutch $d^{04}$. The screw spindle is driven by the clock mechanism C and its speed can be varied by shifting the position of the friction roller $d^{92}$ relatively to the pair of speed cones $c^{20}$ $c^{30}$ as above described with reference to Figs. 4 to 8. The said scale plate is capable of being moved longitudinally by a hand wheel $d^{25}$ working a pinion $d^{26}$ gearing with the teeth of the scale plate. The pointer B is also capable of being disengaged from the screw spindle and moved independently thereof, for which purpose we employ a block $d^{800}$ carried in the frame work $b^9$ of the pointer and having worm teeth gearing with the screw spindle. By pulling outwardly the head $b^{10}$, the block can be disengaged and the whole pointer can then be moved in either direction independently of the screw spindle. The said block is otherwise held engaged with the screw threads of the spindle by a spring $b^{11}$ (Fig. 14). The pointer B can be arranged to be disengaged automatically when it reaches the extreme ends of the instrument. This is accomplished by arranging a cam or inclined plate $b^{12}$ (Figs. 15, 16 and 17) at each end, and providing the block $b^8$ with tail pieces $b^{13}$ which will come into contact with the said cam and disengage the block from the screw $d^{3\times}$ when said pointer reaches the end of either of its extreme movements. A graduated dial and pointer $D^3$ are provided to indicate the speed at which the range or distance between the gun and target is changing. The said pointer is adjusted by a conveniently arranged handle $d^{27}$ mounted on a screw spindle $d^{28}$ which operates to traverse the friction roller $d^{02}$ relatively to the speed cones $c^{20}$ $c^{30}$, the said spindle being geared with the pointer by a worm $d^{29}$ engaging with a worm wheel $d^{30}$ on the pointer axle.

Instead of speed cones we may use a friction disk of the kind hereinbefore described, and thereby dispense with the change gear $d^{23}$.

In the modified form of our instrument illustrated by Figs. 18 and 19, the pointer B is arranged to reciprocate with respect to a cylinder or drum $D^2$ whose surface is spaced and marked longitudinally with divisions which indicate through an opening $A^\times$ in the casing $A'$, variations corresponding with the relative speed at which the range or distance between the gun and target varies, the indications ranging say from 2 to 40 knots or more. The cylinder $D^2$ is capable of being rotated on its axis by a hand wheel $d^{180}$ in order to present to the pointer B the markings corresponding to any particular rate or speed at which the range varies. Further, the cylinder can be caused to traverse longitudinally by means of a hand wheel $d^{190}$ and a rack $d^{200}$ and pinion $d^{210}$, so as to bring the graduations representing the "initial range" opposite the pointer. The said pointer is mounted on a screw spindle $d^{3\times\times}$ which is driven by the clock movement C, thus causing said pointer to traverse the drum $D^2$ longitudinally at a constant speed. The direction of movement of the pointer B can be reversed by a clutch or other suitable mechanism forming part of the clock movement. In some cases we may employ a device like that shown in Fig. 14 for enabling the pointer to be readily disconnected from the screw, so that said pointer may be independently moved relatively to the cylinder D² instead of the cylinder being moved relatively to the pointer. Further, we may arrange the clock movement and gearing to drive the pointer with different speeds, whereby the length of the cylinder D² necessary to give distinct graduations for all the various speeds, may be reduced. Fig. 20 shows an arrangement of two speed gear with change clutch $d^{31}$. When the wheels $d^{32}$ and $d^{33}$ are in gear, the screw $d^{3\times\times}$ will rotate at half the speed obtained when wheels $d^{34}$ and $d^{35}$ are in gear.

In the modification of the instrument illustrated by Figs. 21 and 22 a spirally grooved drum $D^4$ is revolved by a friction disk $c^a$ and traversing friction roller $d^{o3}$, through gear wheels $d^{50}$, so that its speed and direction of movement can be varied and reversed like the pointer B in Figs. 1 to 3, the said disk being driven by the clock movement C. The surface of the spiral is equally divided for the various ranges required. The pointer B is carried on a guide bar $b^{120}$ and is formed to engage with the grooves in the spiral drum whereby it will be moved by the rotation of the drum. The said drum is held on its driving spindle or sleeve solely by friction and is capable of being rotated independently of the said spindle or sleeve by hand, for enabling the readings on the drum to be initially set relatively to the pointer B. An indicator for change of speed is provided at $D^5$ in a convenient position and is analogous in construction to the speed indicating drum described in the preceding arrangements.

Instead of a spiral drum we may use a plain cylindrical strip of sufficient diameter to permit the use of distinct figures and divisions around its periphery. In this case the pointer has a fixed position. Fig. 23 shows this arrangement. The drum $D^{40}$ is driven as before by the variable speed gear. The periphery of this drum will be graduated; the pointer B is fixed. We may use a disk in place of the said cylindrical strip.

What we claim and desire to secure by Letters Patent of the United States is:—

1. A variable range indicating apparatus consisting in the combination of means for initially setting the apparatus to the range and speed of movement between a gun and its target, and of means for continuously actuating said apparatus and causing it to automatically indicate any alteration that takes place in the range due to relative movement between the gun and its target, for the purpose specified.

2. A variable range indicating apparatus consisting in the combination of a member bearing range indications, a member for identifying any of the range indications, means for causing continuous relative movement between these two members, means for initially setting the two members to a particular indication corresponding with the range that exists between a gun and its target when the apparatus is started working, and means for varying the speed and direction of the relative movement between the two members according to the speed at which the range changes, substantially as described.

3. A variable range indicating apparatus consisting in the combination of a member bearing range indications, a pointer, means for causing continuous relative movement between said member and pointer, means for initially setting the indication between said member and pointer to correspond with the range existing between a gun and its target when the apparatus is started working, and means for varying the speed and direction of the relative movement between the said member and pointer according to the speed at which the range changes substantially as described.

4. A variable range indicating apparatus consisting in the combination of a member bearing range indications, a pointer, means for causing said pointer to continuously move with respect to the said member, means for initially setting the indication between said member and the pointer to correspond with the range existing between a gun and its target when the apparatus is started working, and means for varying the speed and direction of movement of the pointer according to the speed at which the range changes substantially as described.

5. A variable range indicating apparatus consisting in the combination of a member bearing range indications, a pointer, a clock movement for causing continuous relative movement between said member and the pointer, means for initially setting the indication between said member and the pointer to correspond with the range existing between a gun and its target when the clock movement is started working, and means for varying the speed and direction of the relative movement between the said member and the pointer according to the speed at which the range changes substantially as described.

6. A variable range indicating apparatus consisting in the combination of a member bearing range indications, a pointer, a clock movement for imparting continuous motion to said pointer, means for initially setting the indication between said member and the pointer to correspond with the range existing between a gun and its target when the clock movement is started working, and means for varying the speed and direction of movement of the pointer according to the speed at which the range changes substantially as described.

7. A variable range indicating apparatus consisting in the combination of a normally stationary member bearing range indications, a pointer, a clock movement for imparting continuous motion to said pointer, means for adjusting the range indications on said range bearing member relatively to the pointer to correspond with the range existing between a gun and its target when the clock movement is started working, and means for varying the speed and direction of movement of the pointer according to the speed at which the range changes substantially as described.

8. A variable range indicating apparatus consisting in the combination of a normally stationary dial bearing range indications, a pointer movable around said dial, a clock movement for imparting continuous motion to said pointer, means for initially adjusting the range indications on said dial relatively to the pointer to correspond with the range existing between the gun and its target when the clock movement is started working, and means for varying the speed and direction of movement of the pointer according to the speed at which the range changes substantially as described.

9. A variable range indicating apparatus consisting in the combination of a member bearing range indications, a pointer means for causing said pointer to continuously move with respect to the said member, means for initially setting the indication between said member and the pointer to correspond with the range existing between a gun and its target when the apparatus is started working, manually operated means for indicating the speed at which said range is changing, and means for varying the speed and direction of movement of the pointer simultaneously with the operation of said speed indicating means substantially as described.

10. A variable range indicating apparatus consisting in the combination of a member bearing range indications, a pointer, means for initially setting the indication between said member and the pointer to correspond with the range existing between a gun and its target when the apparatus is started working, a clock movement, a device transmitting continuous motion from the clock movement to the pointer, manually operated means for indicating the speed at which the range is changing, and means for adjusting the said motion transmitting device simultaneously with the operation of said speed indicating means substantially as described.

11. A variable range indicating apparatus consisting in the combination of a member bearing range indications, a pointer, means for initially setting the indication between said member and the pointer to correspond with the range existing between a gun and its target when the apparatus is started working, a clock movement an adjustable frictional device transmitting continuous motion from the clock movement to the pointer, manually operated means for indicating the speed at which the range is changing and means for adjusting the said motion transmitting device simultaneously with the operation of said speed indicating means, substantially as described.

12. A variable range indicating apparatus consisting in the combination of a member bearing range indications, a pointer, means for initially setting the indication between said member and the pointer to correspond with the range existing between a gun and its target when the apparatus is started working, a clock movement, an adjustable frictional device transmitting continuous motion from the clock movement to the pointer, manually operated means for indicating the speed at which the range is changing, and means for accelerating diminishing and reversing the said motion transmitting device simultaneously with the operation of said speed indicating means substantially as described.

13. A variable range indicating apparatus consisting in the combination of a normally stationary dial bearing range indications, a pointer movable around said dial means for angularly displacing said dial relatively to the pointer for initially setting the indicated range into correspondence with the range existing between a gun and its target when the apparatus is started working, a clock movement, a revolving disk continuously driven by said clock movement at a constant speed, a friction roller lying in contact with and driven by the face of said revolving disk gearing transmitting the rotary motion of the friction roller to the aforesaid pointer, manually operated means for indicating the speed at which the range is changing, and means for causing said friction roller to more or less traverse the face of the revolving disk simultaneously with the operation of said speed indicating means substantially as described.

14. A variable range indicating apparatus consisting in the combination of a normally stationary dial bearing range indications, a pointer movable around said dial, means for angularly displacing said dial relatively to the pointer for initially setting the indicated range into correspondence with the range existing between a gun and its target when the apparatus is started working, a clock movement, a friction disk continuously driven at a constant speed, a friction roller lying in contact with and driven by the face of said friction disk, a spindle revolved by said friction roller, gearing transmitting the rotary motion of the spindle to the aforesaid pointer, a frame carrying said friction roller, rotary screw spindles carrying said frame, mechanism for manually actuating said screw spindles, and a speed indicating drum operated by said mechanism substantially as described.

In testimony whereof we have hereunto set our hands in presence of two subscribing witnesses this first day of March 1905.

ARTHUR TREVOR DAWSON.
JAMES HORNE.

Witnesses:
HENRY KING,
ALFRED PEAKS.